(12) United States Patent
Yoshimoto

(10) Patent No.: US 11,509,789 B2
(45) Date of Patent: Nov. 22, 2022

(54) ELECTRONIC APPARATUS AND COMPUTER READABLE NON-TRANSITORY RECORDING MEDIUM STORING PROGRAM

(71) Applicant: KYOCERA Document Solutions Inc., Osaka (JP)

(72) Inventor: Hiroshi Yoshimoto, Osaka (JP)

(73) Assignee: KYOCERA Document Solutions Inc, Osaka (JP)

( * ) Notice: Subject to any disclaimer, the term of this patent is extended or adjusted under 35 U.S.C. 154(b) by 0 days.

(21) Appl. No.: 17/189,786

(22) Filed: Mar. 2, 2021

(65) Prior Publication Data

US 2021/0281707 A1    Sep. 9, 2021

(30) Foreign Application Priority Data

Mar. 6, 2020 (JP) .............................. JP2020-038596

(51) Int. Cl.
*H04N 1/00* (2006.01)

(52) U.S. Cl.
CPC ....... *H04N 1/00941* (2013.01); *H04N 1/0097* (2013.01); *H04N 2201/0094* (2013.01)

(58) Field of Classification Search
CPC ............. H04N 1/00941; H04N 1/0097; H04N 2201/0094

USPC ........................................................ 358/1.13
See application file for complete search history.

(56) References Cited

U.S. PATENT DOCUMENTS

| | | | |
|---|---|---|---|
| 2007/0038946 A1* | 2/2007 | Grieshaber .......... | H04N 1/0097 715/762 |
| 2015/0347617 A1* | 12/2015 | Weinig .................. | H04L 63/145 715/234 |
| 2015/0373223 A1* | 12/2015 | Furushige .......... | H04N 1/00347 358/1.13 |
| 2016/0014292 A1* | 1/2016 | Furushige .......... | H04N 1/00941 358/1.13 |
| 2016/0283174 A1* | 9/2016 | Feng ....................... | G06F 3/123 |
| 2017/0223208 A1* | 8/2017 | Okamoto ........... | H04N 1/00411 |
| 2019/0306333 A1* | 10/2019 | Watariuchi ......... | H04N 1/00464 |

FOREIGN PATENT DOCUMENTS

WO    2015-182303    12/2015

* cited by examiner

*Primary Examiner* — Neil R McLean
(74) *Attorney, Agent, or Firm* — Lex IP Meister, PLLC

(57) ABSTRACT

An image forming apparatus includes an extended app as an application for implementing a function other than the standard functions of the image forming apparatus, and an apparatus capability service generating information on the capability of the image forming apparatus, the information being used by the extended app when the extended app uses a function. The information on the capability indicates whether a function used by the extended app is effective.

5 Claims, 10 Drawing Sheets

```
<Job>
    <ScanToSend>
        <Color>
        </Color>
        <Duplex>
        </Duplex>
        ·
        ⁎
        ⁎
```

```
    .
    .
    .
<Job>
    <ScanToSend>
        <Color>
            Yes
        </Color>
        <Duplex>
            No
        </Duplex>
        .
        .
        .
```

ELECTRONIC APPARATUS AND COMPUTER READABLE NON-TRANSITORY RECORDING MEDIUM STORING PROGRAM

INCORPORATION BY REFERENCE

This application is based upon, and claims the benefit of priority from, corresponding Japanese Patent Application No. 2020-038596 filed in the Japan Patent Office on Mar. 6, 2020, the entire contents of which are incorporated herein by reference.

BACKGROUND

Field of the Invention

The present disclosure relates to an electronic apparatus allowing the running of an extended app as an application for implementing a function other than standard functions, and a computer readable non-transitory recording medium storing a program.

Description of Related Art

Known as a typical electronic apparatus is an image forming apparatus that includes a standard app as an application for implementing a standard function of the image forming apparatus, an extended app as an application for implementing a function other than the standard functions of the image forming apparatus, and an extended function service providing the extended app with a function of extending a standard function of the image forming apparatus without using a standard app.

SUMMARY

An electronic apparatus according to the present disclosure includes an extended app as an application for implementing a function other than standard functions of the electronic apparatus, and an apparatus capability service generating information on capability of the electronic apparatus, the information being used by the extended app when the extended app uses a function. The information on the capability indicates whether a function used by the extended app is effective.

A computer readable non-transitory recording medium according to the present disclosure stores a program that causes an electronic apparatus to implement an apparatus capability service generating information on capability of the electronic apparatus, the information being used by an extended app as an application for implementing a function other than standard functions of the electronic apparatus when the extended app uses a function. The information on the capability indicates whether a function used by the extended app is effective.

BRIEF DESCRIPTION OF THE DRAWINGS

FIG. 4 is a diagram illustrating an example of information in a Configuration file in FIG. 1, in which file a function used by an extended app has been written by the extended app in itself;

DETAILED DESCRIPTION

In the following, description is made on embodiments of the present disclosure with reference to the accompanying drawings.

First Embodiment

First of all, the configuration of an image forming apparatus as an electronic apparatus according to the present embodiment is described.

Figure 1:
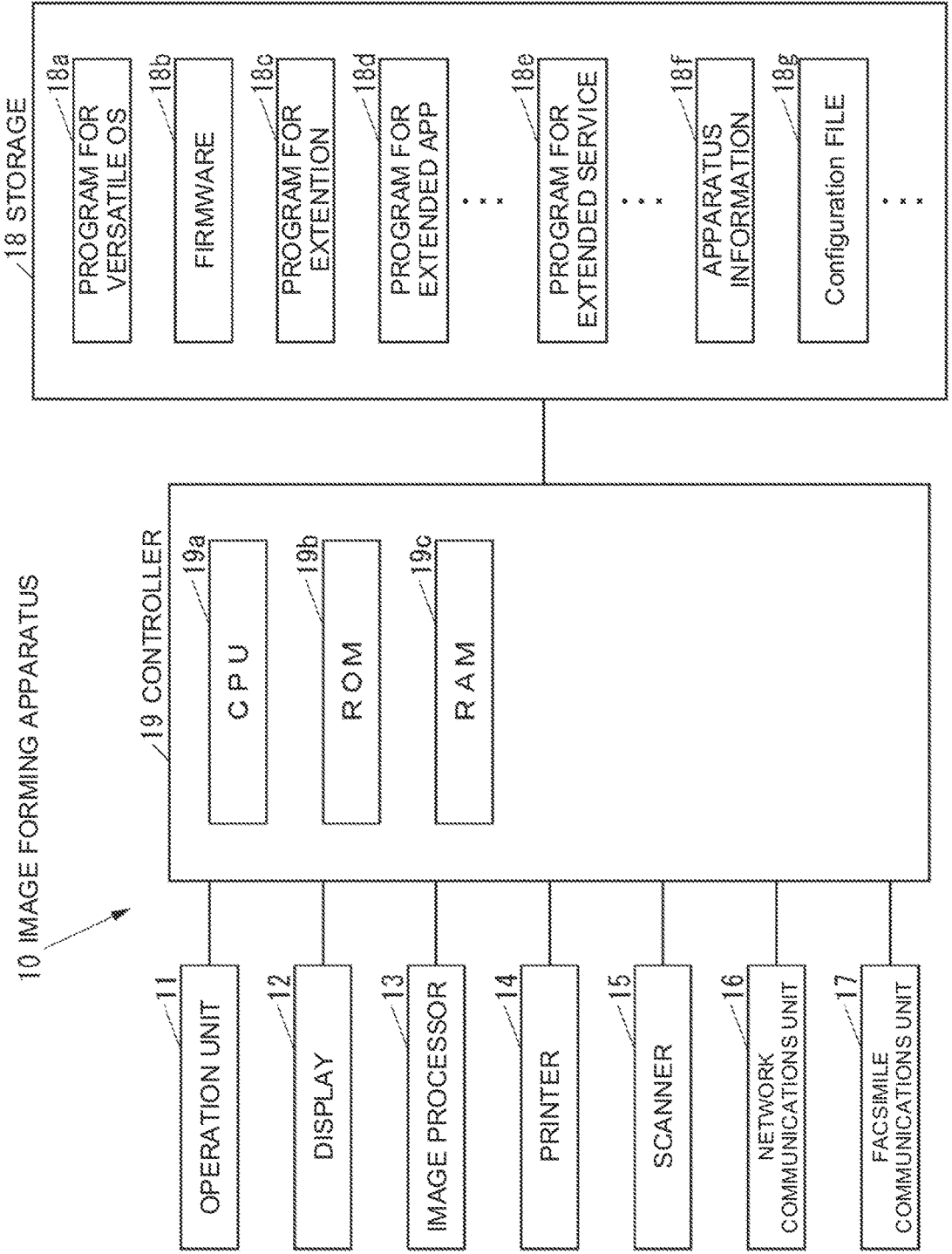
FIG. 1 is a block diagram of hardware of an image forming apparatus according to a first embodiment of the present disclosure.

FIG. 1 is a block diagram of the hardware of an image forming apparatus 10 according to the present embodiment.

As illustrated in FIG. 1, the image forming apparatus 10 is the multifunction peripheral (MFP), which includes an operation unit 11 that is an operating device, such as a button, to input various operations, a display 12 that is a displaying device, such as a liquid crystal display (LCD), to display various types of information, an image processor 13 that is an image processing device, such as a graphics processing unit (GPU), to perform, on image data, various types of image processing including enlargement, reduction, density adjustment, gradation adjustment, and image improvement, a printer 14 that is a printing device to print an image on a recording medium such as a sheet of paper, a scanner 15 that is a reading device to read an image from an original document, a network communications unit 16 that is a communicating device to communicate with an external device across a network such as a local area network (LAN) and the Internet or not across any network but directly in a wired or wireless manner, a facsimile communications unit 17 that is a facsimile device to perform facsimile communications with an external facsimile machine (not illustrated) through a telecommunications line such as a public telephone line, a storage 18 that is a non-volatile storing device, such as a semiconductor memory and a hard disk drive (HDD), to store various types of information, and a controller 19 that controls the entire image forming apparatus 10.

The storage 18 stores a program 18a that is a program for a versatile operating system (OS), such as Linux (registered trademark), for controlling individual hardware components of the image forming apparatus 10 (hereinafter referred to as "program for versatile OS").

The storage 18 stores a firmware 18b of the image forming apparatus 10.

The storage 18 stores a program for extension 18c that is a program for implementing a function other than the standard functions of the image forming apparatus 10.

The storage 18 stores a program 18d that is a program for an extended app as an application for implementing a function other than the standard functions of the image forming apparatus 10 (hereinafter referred to as "program for extended app"). The storage 18 is capable of storing a program for extended app for each extended app.

The storage 18 stores a program 18e that is a program for an extended service offering, to an extended app, a service using the versatile OS without using a standard app as an application for implementing a standard function of the image forming apparatus 10 (hereinafter referred to as "program for extended service"). The storage 18 is capable of storing a program for extended service for each extended service.

The storage 18 stores apparatus information 18f indicating information on the hardware of the image forming apparatus 10. As an example, the apparatus information 18f indicates whether a document feeder is installed as an original document conveying device required for the reading of an image from both faces of an original document with the scanner 15.

The storage 18 is capable of storing a Configuration file 18g holding information required by an extended app. The Configuration file 18g is an Extensible Markup Language (XML) file, for instance. The storage 18 can store a Configuration file with the same structure as the Configuration file 18g apart from the Configuration file 18g. The storage 18 is capable of storing a Configuration file for each extended app. If an extended app is an application cooperating with an external server of the image forming apparatus 10, for instance, a Configuration file includes the Internet Protocol (IP) address of the server. An extended app manages the Configuration file of the extended app's own.

The controller 19 includes, for instance, a central processing unit (CPU) 19a, a read only memory (ROM) 19b storing programs and various types of data, and a random access memory (RAM) 19c as a memory used as a working area of the CPU 19a. The CPU 19a executes a program stored in the storage 18 or the ROM 19b.

Figure 2:
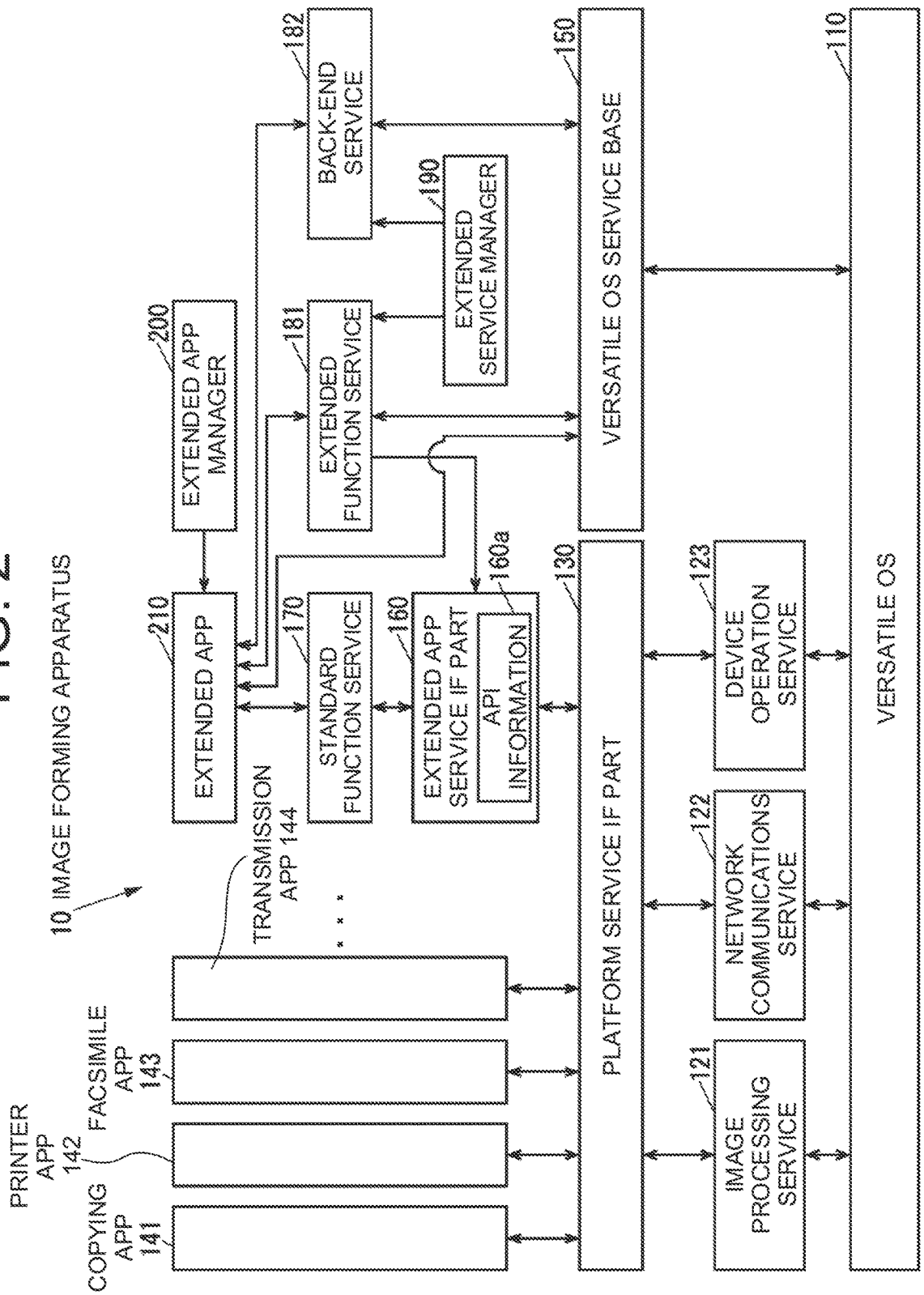
FIG. 2 is a block diagram of a control system of the image forming apparatus illustrated in FIG. 1.

The controller 19 implements a control system illustrated in FIG. 2 by the execution of a program stored in the storage 18 or the ROM 19b.

FIG. 2 is a block diagram of a control system of the image forming apparatus 10.

As illustrated in FIG. 2, the controller 19 executes the program for versatile OS 18a (see FIG. 1) so as to implement a versatile OS 110.

The controller 19 executes the firmware 18b (see FIG. 1) so as to implement an image processing service 121 that runs on the versatile OS 110 to offer a service related to image processing, a network communications service 122 that runs on the versatile OS 110 to offer a service related to communications across a network, and a device operation service 123 that runs on the versatile OS 110 to offer a service operating the individual hardware components of the image forming apparatus 10. The image processing service 121, the network communications service 122, and the device operation service 123 each control the individual hardware components of the image forming apparatus 10 through the versatile OS 110.

The image processing service 121 may offer a service storing the image data, which has been read from an original document with the scanner 15 after setting the resolution, colors, and the like, in the storage 18, and causing the image processor 13 to perform image processing on the image data as stored in the storage 18. The image processing service 121 may offer a service drawing, based on a file, the image data to be printed by the printer 14. The image processing service 121 may offer a service performing image processing, such as enlargement, reduction, rotation, color conversion, noise removal, format conversion, character recognition, and watermark recognition, on image data acquired from an extended app, image data read from an original document with the scanner 15, or image data stored in the storage 18.

The network communications service 122 may offer a service using various protocols such as the Transmission Control Protocol/Internet Protocol (TCP/IP) and the User Datagram Protocol (UDP) to perform transmission and reception of a file, streaming, and transmission and reception of authentication data through the network communications unit 16. For instance, the network communications service 122 can transmit and receive image data read from an original document with the scanner 15 or a file stored in the storage 18. It is also possible for the network communications service 122 to transmit and receive image data subjected to facsimile transmission and reception by the facsimile communications unit 17, to transmit and receive the result of user authentication by a user authentication unit for authenticating a user based on an IC card or biometric authentication if such user authentication unit exists on the image forming apparatus 10, and to transmit and receive video data generated by a camera if the camera exists on the image forming apparatus 10. In addition, the network communications service 122 can transmit and receive the state of each component of the image forming apparatus 10, the result of the calling of a function of each component, and the like.

The device operation service 123 may offer a service performing a process for drawing on the display 12, driving the printer 14, controlling the facsimile communications unit 17, conducting user authentication, or acquiring the status of individual hardware components of the image forming apparatus 10. The device operation service 123 may offer a service storing image data read from an original document with the scanner 15 in the storage 18, a service drawing an image on a browser displayed on the display 12, a service transmitting image data to the printer 14 to make an image formed, or a service subjecting image data stored in the storage 18 to facsimile transmission by the facsimile communications unit 17. The device operation service 123 may offer a service causing an optional device such as a finisher to perform a process for bookbinding or stapling if the optional device exists on the image forming apparatus 10, a service causing a user authentication unit for authenticating a user based on an IC card or biometric authentication to perform user authentication if such user authentication unit exists on the image forming apparatus 10, or a service causing a camera to generate video data and calling functions including gaze detection based on the video data generated by the camera if the camera exists on the image forming apparatus 10. The device operation service 123 may offer a service performing specific control of the individual hardware components of the image forming apparatus 10, such as driving of one of motors of a conveyance part of the printer 14. The device operation service 123 may offer a service acquiring the state of each component of the image forming apparatus 10.

The controller 19 executes the firmware 18b so as to implement a platform service interface (IF) part 130 that provides an interface for calling the image processing service 121, the network communications service 122, and the device operation service 123.

The controller 19 executes the firmware 18b so as to implement a standard app. The standard app runs on the platform service IF part 130 to use the individual hardware components of the image forming apparatus 10. The controller 19 implements, for instance, a copying app 141 as a standard app for realizing the copying, in which an image is read from an original document with the scanner 15 and the read image is printed by the printer 14 according to the instructions as input to the operation unit 11, a printer app 142 as a standard app for printing, by the printer 14, an image based on such data as described in a page description language (PDL) that is received by the network communications unit 16, a facsimile app 143 as a standard app for reading an image from an original document with the scanner 15 and transmitting the read image by the facsimile communications unit 17 according to the instructions as input to the operation unit 11, and a transmission app 144 as a standard app for reading an image from an original document with the scanner 15 and transmitting the read image by the network communications unit 16 according to the instructions as input to the operation unit 11. The printer app 142 may print, by the printer 14, an image based on a file stored in the storage 18, according to the instructions as input to the operation unit 11. The facsimile app 143 may transmit, by the facsimile communications unit 17, an image based on a file received by the network communications unit 16, print, by the printer 14, an image received by the facsimile communications unit 17 or store an image received by the facsimile communications unit 17 in the storage 18.

The controller 19 executes the program for extension 18c (see FIG. 1) so as to implement a versatile OS service base 150 that offers a service using the versatile OS 110 without the intervention of the platform service IF part 130. The versatile OS service base 150 may offer a service adding a function to the versatile OS 110 by, for instance, installing a control program such as a device driver and a script on the versatile OS 110.

The controller 19 executes the program for extension 18c so as to implement an extended app service IF part 160 that provides an interface for using the platform service IF part 130 from the extended app side. The extended app service IF part 160 holds application program interface (API) information 160a that is information about an API for using a function of the image forming apparatus 10. Examples of information contained in the API information 160a include information on whether an API for color image reading (hereinafter referred to as "color scanning API") is present when an image is read from an original document with the scanner 15, and information on whether an API for reading an image from both faces of an original document (hereinafter referred to as "duplex scanning API") is present when an image is read from an original document with the scanner 15.

The controller 19 executes the program for extension 18c so as to implement a standard function service 170 as a service using a standard app to provide an extended app with a standard function of the image forming apparatus 10. The standard function service 170 uses a standard app through the extended app service IF part 160. For instance, an extended app can use the standard function service 170 to display a screen for the start of copying by the copying app 141 on the display 12. In addition, an extended app can use the standard function service 170 to cause the printer app 142 to print various types of job data and files acquired by the extended app in itself or designated through the operation unit 11. Furthermore, an extended app can use the standard function service 170 to acquire image data designated through the operation unit 11 out of the image data of facsimiles received by the facsimile app 143 or cause the facsimile app 143 to transmit a file designated through the operation unit 11.

The controller 19 executes the program for extended service 18d (see FIG. 1) so as to implement an extended service as a service providing a function other than the standard functions of the image forming apparatus 10. For instance, the controller 19 implements an extended function service 181 as an extended service offering, to an extended app, a service using the platform service IF part 130 without using a standard app, and using the versatile OS service base 150 to use the versatile OS 110, and a back-end service 182 as an extended service offering, to an extended app, a service using the versatile OS service base 150 to use the versatile OS 110 without using the platform service IF part 130. The extended function service 181 uses the platform service IF part 130 through the extended app service IF part 160. The controller 19 can implement at least one extended function service apart from the extended function service 181. The controller 19 can implement at least one back-end service apart from the back-end service 182.

An extended function service refers to a service providing an extended app with a function of extending a standard function of the image forming apparatus 10. For instance, the controller 19 implements an apparatus capability service generating information on the capability of the image forming apparatus 10 as one of extended function services.

A back-end service refers to a service that works on the back end. The back-end service is a service providing a function that is neither a standard function of the image forming apparatus 10 nor a function of extending a standard function of the image forming apparatus 10. Examples of the back-end service include a service providing a function of monitoring the image forming apparatus 10, a service providing a function of monitoring the entire system, which is constituted of a plurality of image forming apparatuses, a service providing a function of monitoring a specified server, a service providing a function of collecting information about a counter in the image forming apparatus 10 that indicates the number of printed sheets, and the like from the image forming apparatus 10 and converting the collected information into information whose format is understandable to a person, and a service providing a function of changing the format of information output from the image forming apparatus 10 from a format for an old type interface into a format for a new type interface.

The controller 19 executes the program for extension 18c so as to implement an extended service manager 190 that performs management of an extended service, such as booting, starting, and stopping of an extended service. The extended service manager 190 monitors the state of an extended service and of the versatile OS service base 150.

The controller 19 executes the program for extension 18c so as to implement an extended app manager 200 that performs management of an extended app, such as booting, starting, and stopping of an extended app.

The controller 19 executes the program for extended app 18d (see FIG. 1) so as to implement an extended app 210. The controller 19 can implement at least one extended app apart from the extended app 210. An extended app is an application directly used by a user, and includes a user interface. The user is able to use a function provided by an extended app by operating the user interface of the extended app. The extended app 210 may be an optical character recognition (OCR) app, a monitoring camera app or any other practical app, such as an app for watermark forming, billing, list of members management, slip management, contract management, name card management, portable document format (PDF) file creation, account book management, group management or the like, or a management app such as an installer app for performing addition and change of a device driver, a firmware, and the like on the versatile OS 110. The extended app 210 is capable of calling the standard function service 170 to use a standard app and use thereby the versatile OS 110, calling an extended service to use the versatile OS 110 without using a standard app, and directly calling the versatile OS service base 150 to use the versatile OS 110.

The next description is made on the operation of the image forming apparatus 10.

Initially, an operation of an extended app when a function used by the extended app is written in a Configuration file is described.

Figure 3:
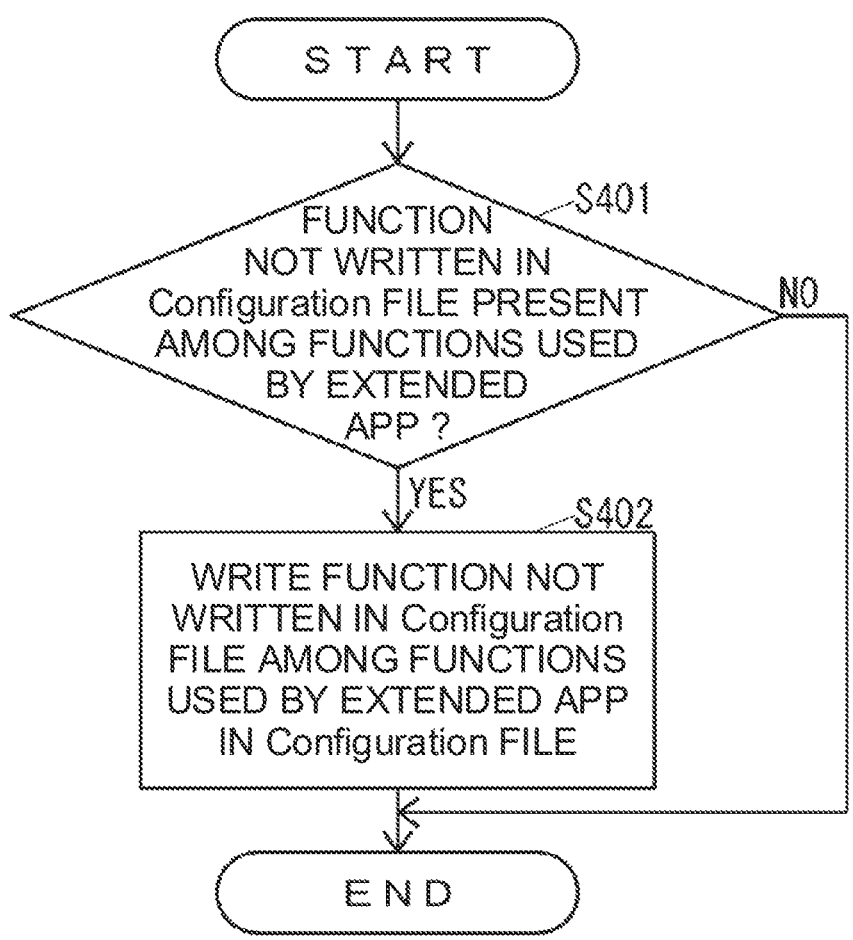
FIG. 3 is a flowchart of an operation of an extended app in FIG. 2 when a function used by the extended app is written in a Configuration file.

FIG. 3 is a flowchart of an operation of an extended app when a function used by the extended app is written in a Configuration file.

If installed in the image forming apparatus 10 and booted, an extended app performs the operation illustrated in FIG. 3.

As illustrated in FIG. 3, an extended app determines whether a function that is not written in the Configuration file of the extended app's own on the storage 18 is present among the functions used by the extended app in itself (step S401). At that time, the extended app accesses the storage 18 through the standard function service 170, the extended app service IF part 160, the platform service IF part 130, and the device operation service 123.

If determining, in step S401, that a function that is not written in the Configuration file of the extended app's own on the storage 18 is present among the functions used by the extended app in itself, the extended app writes the function not written in the Configuration file among the functions used by the extended app in itself in the Configuration file (step S402).

The extended app ends the operation illustrated in FIG. 3 if determining, in step S401, that a function not written in the Configuration file of the extended app's own on the storage 18 is not present among the functions used by the extended app in itself, or when the process in step S402 is completed.

Figure 4:
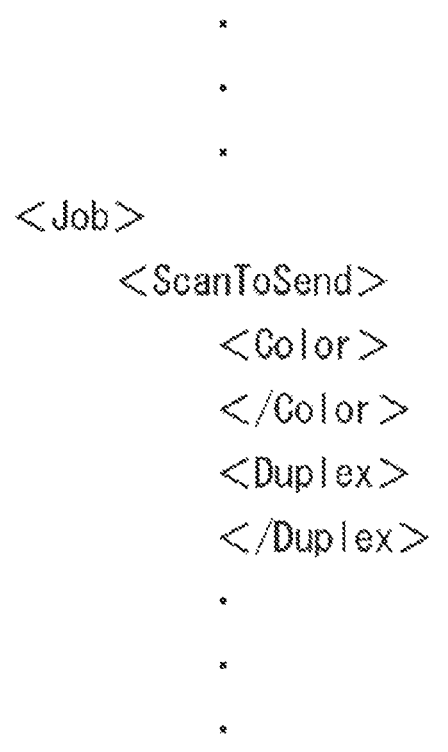

FIG. 4 is a diagram illustrating an example of information in a Configuration file, in which a function used by an extended app has been written by the extended app in itself.

The "Job" element as illustrated in FIG. 4 is an element indicating information on the capability. An element one hierarchical level under the "Job" element indicates the type of a job. Examples of the element indicating the type of a job include the "ScanToSend" element, which indicates a "ScanToSend" job as a job transmitting an image read from an original document with the scanner 15 through the network communications unit 16. An element one hierarchical level under the element indicating the type of a job indicates an API available for the job in question. The element indicating an API available for the "ScanToSend" job, for instance, includes the "Color" element, which indicates a color scanning API, and the "Duplex" element, which indicates a duplex scanning API.

As illustrated in FIG. 4, with respect to the element indicating an API available for the job in question, the tag of the element is only included and the contents of the element are not included in the information on the capability in the Configuration file, in which a function used by an extended app has been written by the extended app in itself. In other words, in the information on the capability in the Configuration file illustrated in FIG. 4, items of the capability are only included and values of the capability are not included.

The next description is made on an operation of the apparatus capability service when a value of information on the capability is imparted to a Configuration file.

Figure 5:
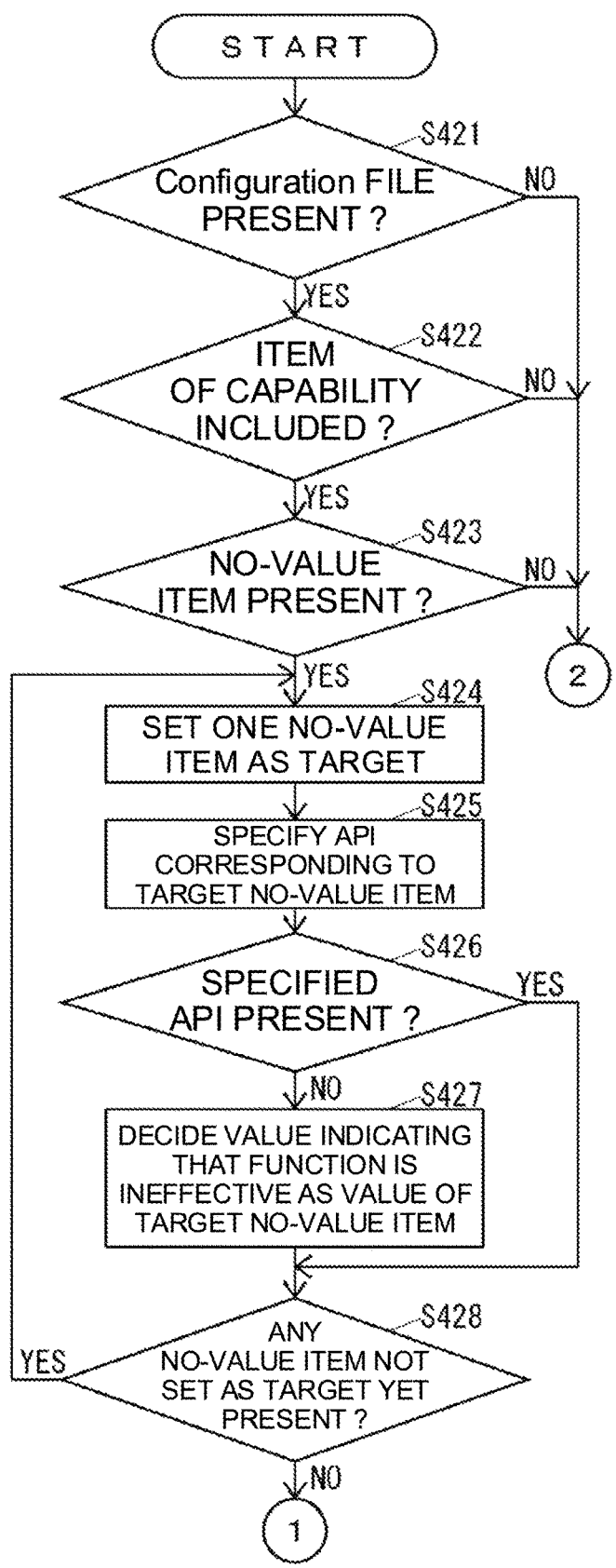
FIG. 5 is a flowchart partially illustrating an operation of an apparatus capability service when a value of information on capability is imparted to the Configuration file in FIG. 1.
Figure 6:
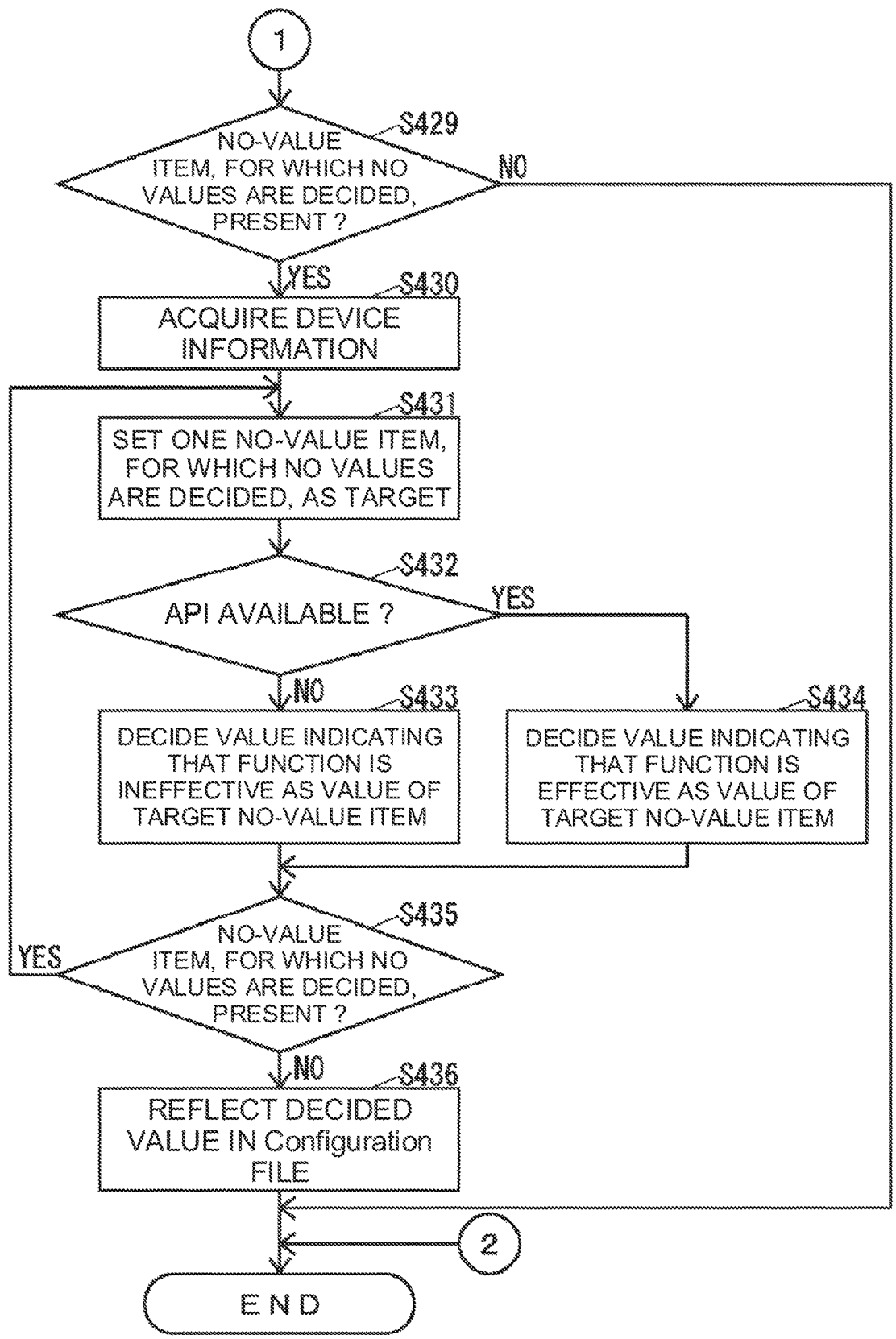
FIG. 6 is a flowchart following the flowchart of FIG. 5.

FIG. 5 is a flowchart partially illustrating an operation of the apparatus capability service when a value of information on the capability is imparted to a Configuration file. FIG. 6 is a flowchart following the flowchart of FIG. 5.

If detecting the booting of an extended app by, for instance, receiving a notification that the extended app has been booted, the apparatus capability service performs the operation illustrated in FIGS. 5 and 6.

As illustrated in FIGS. 5 and 6, the apparatus capability service determines whether a Configuration file of the extended app, whose booting is detected, (in the description on the operation illustrated in FIGS. 5 and 6, hereinafter referred to as "target extended app") is present on the storage 18 (step S421). At that time, the apparatus capability service accesses the storage 18 through the extended app service IF part 160, the platform service IF part 130, and the device operation service 123.

If determining, in step S421, that a Configuration file of the target extended app is present, the apparatus capability service determines whether an item of the capability is included in the Configuration file of the target extended app (step S422).

If determining, in step S422, that an item of the capability is included in the Configuration file of the target extended app, the apparatus capability service determines whether the item, to which a value of the capability is not imparted, (hereinafter referred to as "no-value item") is present among items of the capability included in the Configuration file of the target extended app (step S423).

If determining, in step S423, that a no-value item is present, the apparatus capability service sets only one of no-value items, which is not set as a target for the process in step S426 yet, as a target (step S424).

Then, the apparatus capability service specifies an API corresponding to the current target no-value item based on the name of the tab of the current target no-value item (step S425). If the current target no-value item is the "Duplex" element under the "ScanToSend" element, the apparatus capability service determines that the API, which corresponds to the current target no-value item, is a duplex scanning API, based on the name "Duplex" of the tab of the "Duplex" element under the "ScanToSend" element.

After the process in step S425, the apparatus capability service determines whether the API specified in step S425 is present, based on the API information 160a on the extended app service IF part 160 (step S426).

If determining, in step S426, that the API specified in step S425 is not present, the apparatus capability service decides a value indicating that a function is ineffective as the value of the current target no-value item (step S427).

If determining, in step S426, that the API specified in step S425 is present, or when the process in step S427 is completed, the apparatus capability service determines whether a no-value item not set as a target for the process in step S426 yet is present (step S428).

If determining, in step S428, that a no-value item not set as a target for the process in step S426 yet is present, the apparatus capability service performs the process in step S424.

If determining, in step S428, that a no-value item not set as a target for the process in step S426 yet is not present, the apparatus capability service determines whether the no-value item, for which no values are decided, is present (step S429).

If determining, in step S429, that the no-value item, for which no values are decided, is present, the apparatus capability service acquires the apparatus information 18$f$ from the storage 18 (step S430). At that time, the apparatus capability service accesses the storage 18 through the extended app service IF part 160, the platform service IF part 130, and the device operation service 123.

Then, the apparatus capability service sets only one of the no-value items, for each of which no values are decided, as a target (step S431).

Then, the apparatus capability service determines whether the API specified in step S425 is available for the current target no-value item, based on the apparatus information 18$f$ acquired in step S430 (step S432). If the API specified in step S425 is a duplex scanning API and it is indicated in the apparatus information 18$f$ that a document feeder is not installed in the image forming apparatus 10, the apparatus capability service determines that the API specified in step S425 is not available. On the other hand, if the API specified in step S425 is a duplex scanning API and it is indicated in the apparatus information 18$f$ that a document feeder is installed in the image forming apparatus 10, the apparatus capability service determines that the API specified in step S425 is available.

If determining, in step S432, that the API specified in step S425 is not available, the apparatus capability service decides a value indicating that a function is ineffective as the value of the current target no-value item (step S433).

If determining, in step S432, that the API specified in step S425 is available, the apparatus capability service decides a value indicating that a function is effective as the value of the current target no-value item (step S434).

After the process in step S433 or S434, the apparatus capability service determines whether the no-value item, for which no values are decided, is present (step S435).

If determining, in step S435, that the no-value item, for which no values are decided, is present, the apparatus capability service performs the process in step S431.

If determining, in step S435, that the no-value item, for which no values are decided, is not present, the apparatus capability service reflects the value decided in step S427, S433 or S434 in the Configuration file of the target extended app (step S436).

If determining, in step S421, that a Configuration file of the target extended app is not present, determining, in step S422, that an item of the capability is not included in the Configuration file of the target extended app, determining, in step S423, that a no-value item is not present or determining, in step S429, that the no-value item, for which no values are decided, is not present, or when the process in step S436 is completed, the apparatus capability service ends the operation illustrated in FIGS. 5 and 6.

Figures 7, 8:
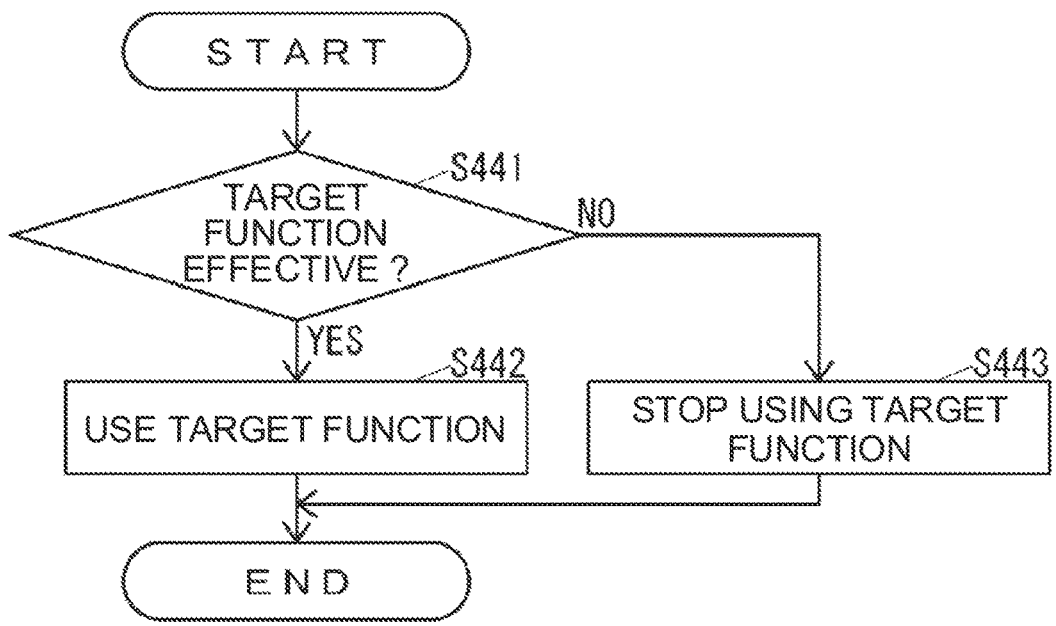
FIG. 7 is a diagram illustrating an example of the information on the capability in the Configuration file after the end of the operation illustrated in FIGS. 5 and 6.
FIG. 8 is a flowchart of an operation of the image forming apparatus illustrated in FIG. 1 when an extended app refers to a Configuration file so as to use a function of the image forming apparatus.

FIG. 7 is a diagram illustrating an example of the information on the capability in the Configuration file after the end of the operation illustrated in FIGS. 5 and 6.

In the information on the capability illustrated in FIG. 7, "Yes," which is a value indicating that a function is effective, is contained as the contents of the "Color" element, and "No," which is a value indicating that a function is ineffective, is contained as the contents of the "Duplex" element.

The next description is made on an operation of the image forming apparatus 10 when an extended app refers to the Configuration file so as to use a function of the image forming apparatus 10.

FIG. 8 is a flowchart of an operation of the image forming apparatus 10 when an extended app refers to the Configuration file so as to use a function of the image forming apparatus 10.

When using a function (in the description on the operation illustrated in FIG. 8, hereinafter referred to as "target function") of the image forming apparatus 10, an extended app performs the operation illustrated in FIG. 8.

As illustrated in FIG. 8, an extended app determines whether the target function is effective, based on the Configuration file of the extended app in itself (step S441). At that time, the extended app accesses the storage 18 through the standard function service 170, the extended app service IF part 160, the platform service IF part 130, and the device operation service 123.

If determining, in step S441, that the target function is effective, the extended app uses the target function (step S442), and ends the operation illustrated in FIG. 8.

If determining, in step S441, that the target function is ineffective, the extended app stops using the target function (step S443), and ends the operation illustrated in FIG. 8.

As described above, in the image forming apparatus 10, information indicating whether a function used by an extended app is effective is generated as the information on the capability of the image forming apparatus 10, which information on the capability is used by an extended app when the extended app uses a function (step S436), so that it is possible to cause the one and the same extended app to run among a plurality of image forming apparatuses including the image forming apparatus 10 that are different in configuration from one another.

In the image forming apparatus 10, a function used by an extended app is written in a Configuration file by the extended app in itself, and information indicating whether a function written in the Configuration file is effective is generated by the apparatus capability service (step S436), so that it is possible to generate information indicating whether a function is effective only for a function used by an extended app.

In the image forming apparatus 10, a function used by an extended app is written in a Configuration file by the extended app in itself, and information indicating whether a function written in the Configuration file is effective is generated by the apparatus capability service (step S436), so that it is possible to generate information indicating whether a function used by an extended app is effective for a plurality of functions collectively.

In the image forming apparatus 10, the apparatus capability service is implemented as an extended service, so that it is possible to use one and the same apparatus capability service among a plurality of image forming apparatuses including the image forming apparatus 10 that are different in configuration from one another.

Second Embodiment

The configuration of an image forming apparatus according to the present embodiment is similar to the configuration of the image forming apparatus 10 (see FIG. 1) according to the first embodiment. Consequently, among the configuration elements of the image forming apparatus according to the present embodiment, those which are similar to the configuration elements of the image forming apparatus 10 are denoted by reference signs identical to the reference signs of the configuration elements of the image forming apparatus 10, and detailed description on such configuration elements is omitted.

The following description is made on the operation of the image forming apparatus according to the present embodiment.

Figure 9:
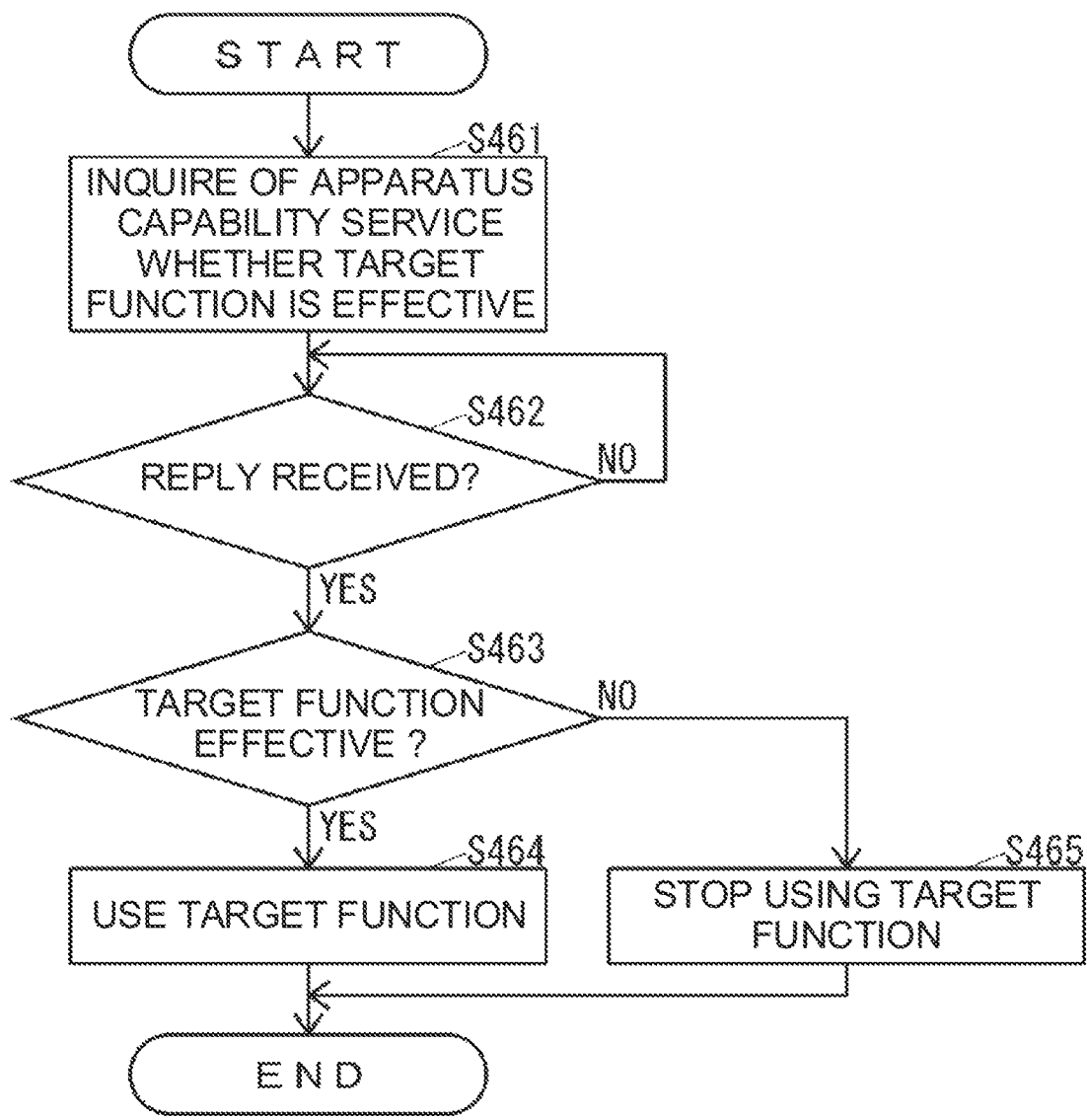
FIG. 9 is a flowchart of an operation of an image forming apparatus according to a second embodiment of the present disclosure when an extended app inquires of an apparatus capability service so as to use a function of the image forming apparatus.

FIG. 9 is a flowchart of an operation of the image forming apparatus according to the present embodiment when an extended app inquires of an apparatus capability service so as to use a function of the image forming apparatus.

When using a function (in the description on the operations illustrated in FIGS. 9 and 10, hereinafter referred to as "target function") of the image forming apparatus according to the present embodiment, an extended app performs the operation illustrated in FIG. 9.

As illustrated in FIG. 9, an extended app inquires of an apparatus capability service whether the target function is effective (step S461).

Then, the extended app determines whether a reply has been received from the apparatus capability service until determining that a reply has been received from the apparatus capability service (step S462).

Figure 10:
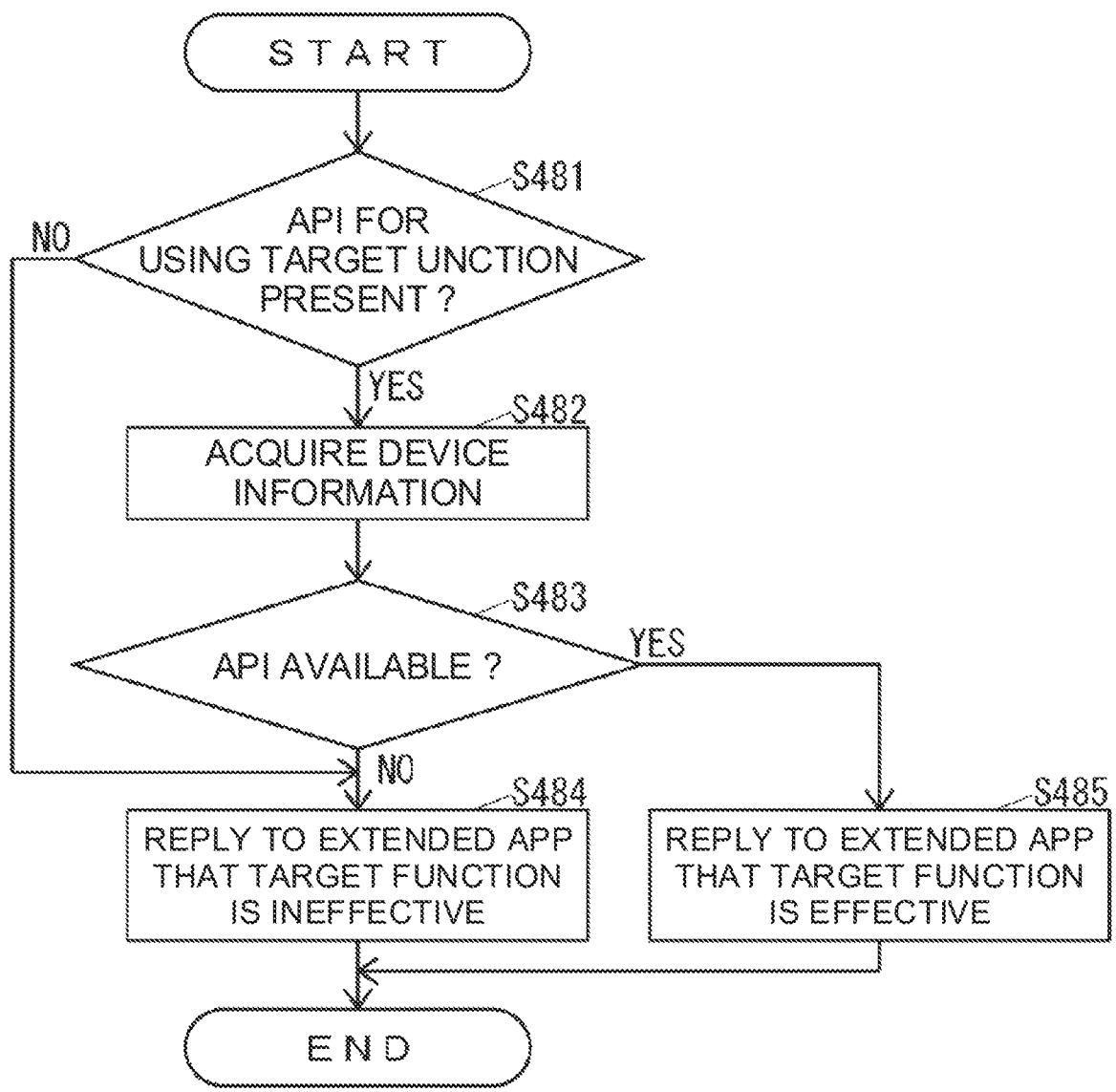
FIG. 10 is a flowchart of an operation of an apparatus capability service of the image forming apparatus according to the second embodiment of the present disclosure, of which apparatus capability service an extended app has inquired whether a target function is effective.

FIG. 10 is a flowchart of an operation of the apparatus capability service, of which the extended app has inquired whether the target function is effective.

When inquired of in step S461, the apparatus capability service performs the operation illustrated in FIG. 10.

As illustrated in FIG. 10, the apparatus capability service determines whether an API for using the target function is present, based on the API information 160a on the extended app service IF part 160 (step S481).

If determining, in step S481, that an API for using the target function is present, the apparatus capability service acquires apparatus information 18f from a storage 18 (step S482). At that time, the apparatus capability service accesses the storage 18 through the extended app service IF part 160, a platform service IF part 130, and a device operation service 123.

After the process in step S482, the apparatus capability service determines whether the API for using the target function is available based on the apparatus information 18f acquired in step S482, the same way as the process in step S432 (see FIG. 6) (step S483).

If determining, in step S481, that the API for using the target function is not present or determining, in step S483, that the API for using the target function is not available, the apparatus capability service replies to the extended app that the target function is ineffective (step S484), and ends the operation illustrated in FIG. 10.

If determining, in step S483, that the API for using the target function is available, the apparatus capability service replies to the extended app that the target function is effective (step S485), and ends the operation illustrated in FIG. 10.

As illustrated in FIG. 9, if determining, in step S462, that a reply has been received from the apparatus capability service, the extended app determines whether the target function is effective, based on the reply from the apparatus capability service (step S463).

If determining, in step S463, that the target function is effective, the extended app uses the target function (step S464), and ends the operation illustrated in FIG. 9.

If determining, in step S463, that the target function is ineffective, the extended app stops using the target function (step S465), and ends the operation illustrated in FIG. 9.

In the present embodiment, the apparatus capability service determines whether the target function is effective based on the API information 160a and the apparatus information 18f each time an extended app inquires of the apparatus capability service whether the target function is effective. The apparatus capability service may hold information on the capability in a Configuration file, as is the case with the first embodiment, so as to determine whether the target function is effective based on the Configuration file of an extended app when the extended app inquires of the apparatus capability service whether the target function is effective. The apparatus capability service may write, in a Configuration file, the information on the capability, which is determined based on the API information 160a and the apparatus information 18f when an extended app is booted, as is the case with the first embodiment, or the information on the capability, which is determined based on the API information 160a and the apparatus information 18f when an extended app first inquires of the apparatus capability service, for each function, whether the function is effective, as illustrated in FIG. 11.

Figure 11:
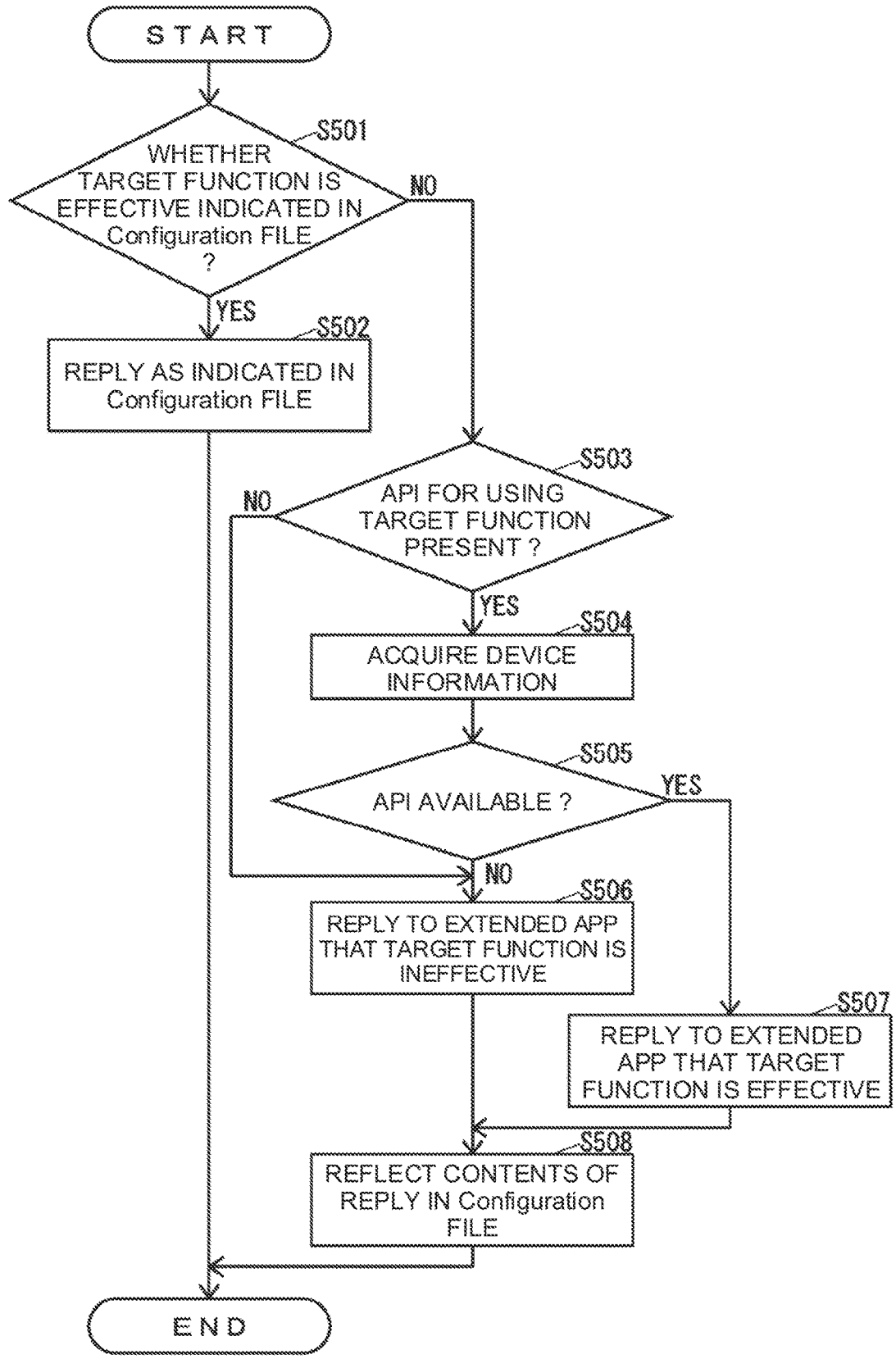
FIG. 11 is a flowchart of an operation of the apparatus capability service, of which an extended app has inquired whether a target function is effective, the operation being different from the operation illustrated in FIG. 10.

FIG. 11 is a flowchart of an operation of the apparatus capability service, of which an extended app has inquired whether the target function is effective, the operation being different from the operation illustrated in FIG. 10.

When inquired of in step S461, the apparatus capability service performs the operation illustrated in FIG. 11.

As illustrated in FIG. 11, the apparatus capability service determines whether it is indicated in the Configuration file of the extended app, which is the inquirer in step S461, (in the description on the operation illustrated in FIG. 11, hereinafter referred to as "target extended app") whether the target function is effective (step S501).

If determining, in step S501, that it is indicated in the Configuration file of the target extended app whether the target function is effective, the apparatus capability service replies to the target extended app as indicated in the Configuration file of the target extended app, that is to say, replies that the target function is effective or that the target function is ineffective (step S502), and ends the operation illustrated in FIG. 11.

If determining, in step S501, that it is not indicated in the Configuration file of the target extended app whether the target function is effective, the apparatus capability service performs the processes in steps S503 through S507, which are the same as the processes in steps S481 through S485.

After the process in step S506 or S507, the apparatus capability service reflects the contents of the reply in the process in step S506 or S507 in the Configuration file of the target extended app (step S508), and ends the operation illustrated in FIG. 11.

As described above, in the image forming apparatus according to the present embodiment, an extended app in itself inquires of the apparatus capability service whether a function used by the extended app is effective (step S461) and the apparatus capability service generates information indicating whether the function used by the extended app is effective in response to the inquiry from the extended app (steps S484, S485, S506, and S507), so that it is possible to generate information indicating whether a function is effective only for a function used by an extended app.

In each of the embodiments as above, some programs may be combined into a single program. For instance, the program for extension 18c may be combined with a program for extended service into a single program.

While the electronic apparatus according to the present disclosure is an image forming apparatus in each of the embodiments as above, the electronic apparatus according to the present disclosure may be an electronic apparatus other than the image forming apparatus, such as a personal computer (PC).

What is claimed is:

1. An electronic apparatus comprising:
   an extended app as an application for implementing a function other than standard functions of the electronic apparatus; and
   an apparatus capability service generating information on capability of the electronic apparatus depending on configuration of the electronic apparatus, written in a specific file, the information being used by the extended app when the extended app uses a function,
   wherein the apparatus capability service decides a value that indicates whether a function used by the extended app, written in the specific file, is available or not with respect to the electronic apparatus among a plurality of electronic apparatuses including the electronic apparatus that are different in configuration from one another, generates the information on the capability on the basis of the value decided, and reflects the value decided in the specific file as the information generated.

2. The electronic apparatus according to claim 1, wherein the extended app writes the function used by the extended app in the specified file.

3. The electronic apparatus according to claim 1,
   wherein the extended app inquires of the apparatus capability service whether the function used by the extended app is available or not, and
   wherein the apparatus capability service generates, in response to an inquiry from the extended app, information indicating whether the function used by the extended app is available or not.

4. The electronic apparatus according to claim 1, wherein the apparatus capability service is an extended service that provides the extended app with a function other than the standard functions.

5. A computer readable non-transitory recording medium storing a program that causes an electronic apparatus to implement an apparatus capability service generating information on capability of the electronic apparatus depending on configuration of the electronic apparatus, written in a specific file, the information being used by an extended app as an application for implementing a function other than standard functions of the electronic apparatus when the extended app uses a function,
   wherein the apparatus capability service decides a value that indicates whether a function used by the extended app, written in the specific file, is available or not with respect to the electronic apparatus among a plurality of electronic apparatuses including the electronic apparatus that are different in configuration from one another, generates the information on the capability on the basis of the value decided, and reflects the value decided in the specific file as the information generated.

* * * * *